Figure 1:
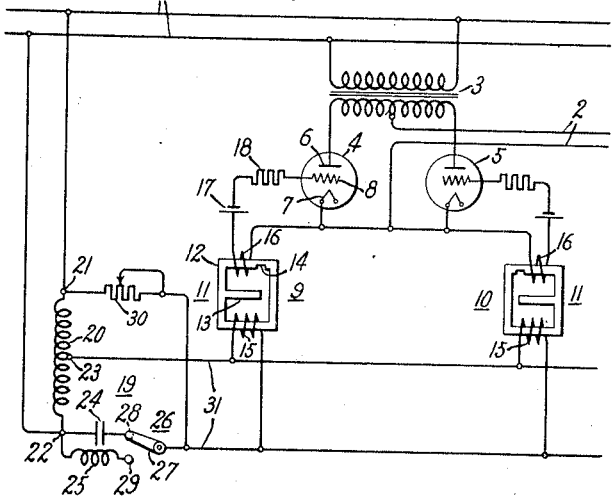

Jan. 14, 1941.                H. L. PALMER                2,228,844
                         ELECTRIC VALVE CIRCUITS
                       Original Filed Dec. 14, 1937

Inventor:
Harry L. Palmer,
by Harry E. Dunham
His Attorney.

Patented Jan. 14, 1941

2,228,844

UNITED STATES PATENT OFFICE 2,228,844

ELECTRIC VALVE CIRCUITS

Harry L. Palmer, Schenectady, N. Y., assignor to General Electric Company, a corporation of New York Original application December 14, 1937, Serial No. 179,718. Divided and this application August 6, 1938, Serial No. 223,512

2 Claims. (Cl. 250—27)

My invention relates to electric valve circuits and more particularly to electric circuits for controlling electric valves and which shift the phase of an alternating voltage derived from the source with respect to the potential of that source.

This application is a division of my copending application Serial No. 179,718, filed December 14, 1937, and assigned to the assignee of the present application.

My invention is of general application in electric control and regulating systems, although it is particularly adaptable for use in connection with electric valve converting apparatus for transmitting energy between direct current and alternating current systems, or between two alternating current systems, by the use of electric valves. In such apparatus, it is customary to control the transmission of power between the direct current and alternating current systems by shifting the potentials applied to the control members or grids of the electric valves with respect to the applied anode-cathode voltages. Various arrangements have been provided heretofore to effect this phase shift of the control member voltages. Static phase shifters, that is, electric circuits including various combinations of resistances, inductances and capacitances, have proved to be most satisfactory from the standpoint of simplicity, economy, and reliability.

In some electric valve circuits, it is desirable to produce control voltages adjustable in phase throughout the first and second lagging quadrants relative to the applied anode-cathode voltages of the electric valves. In addition, it has been found that satisfactory control of electric valve apparatus is effected by employing saturable inductive devices for producing alternating voltages of peaked wave form which render the electric valves conductive at precisely determinable instants during the cycles of applied anode voltage. As is well known, in saturable inductive devices the voltage of peaked wave form produced thereby occurs at substantially the maximum value of the alternating voltage which is applied to the inductive device. There has been evidenced a decided need for simple and rugged phase shifting apparatus which permits a smooth and continuous adjustment in phase of the voltage of peaked wave form derived from saturable inductive devices throughout the first and second lagging quadrants with respect to the voltage of the circuit to which the electric valve apparatus is connected. This need has been particularly evident in view of the increased application of electric valve apparatus to welding circuits in which energy is supplied to a work circuit during accurately determinable intervals of time and in which it is desirable to control precisely the amount of energy transmitted during each cycle of voltage of the source. Furthermore, in circuits of this nature it is desirable to obtain a smooth control of the phase of the voltage of peaked wave form from the angle corresponding to the power factor angle of the load circuit to a lagging angle of substantially 135 degrees to obtain the desired control of the energy transmitted during each cycle.

It is an object of my invention to provide a new and improved electric valve circuit.

It is another object of my invention to provide a new and improved phase shifting circuit for electric valve apparatus whereby there is afforded greater facility in control and greater apparatus economy than available in the prior art arrangements.

In accordance with the illustrated embodiments of my invention, I provide new and improved phase shifting circuits for controlling electric valves. The phase shifting circuits include a winding which is energized from a source of alternating current and which is provided with a pair of terminal connections and an electrically intermediate connection. To one of the terminal connections there is connected a pair of electric paths, one of which includes a capacitance and the other of which includes an inductance. Suitable switching means is provided to permit selective connection of the capacitance or the inductance in the circuit. An adjustable resistance is connected to the other terminal connection and is also connected to the switching means. The output circuit of the phase shifting arrangement is connected across the intermediate connection and the switching means. Alternating voltages of peaked wave form are impressed on the control members of associated electric valve apparatus by means of saturable inductive devices, the primary windings of which are connected to the output circuit of the phase shifting circuit. The switching means establishes two distinct ranges of phase shift of the alternating voltages of peaked wave form impressed on the control members; that is, the alternating voltages of peaked wave form may be varied throughout the first or the second lagging quadrant relative to the applied anode-cathode voltages of the electric valves, depending upon the position of the switching means. The adjustable resistance serves as a means for varying the phase position of the alternating voltages of peaked wave form within the respective ranges.

In one embodiment of my invention there is provided a modification of the arrangement above described whereby the output voltage may be varied progressively from an inphase position to the 180 electrical degree lagging position by movement of an actuating member progressively in one direction.

Figure 2:
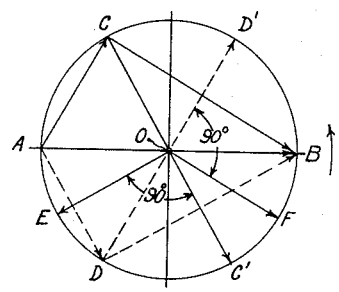
Figure 3:
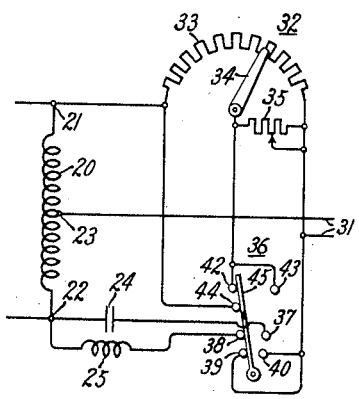
Figure 4:
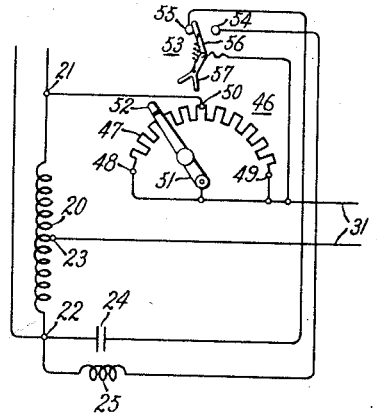

For a better understanding of my invention, reference may be had to the following description taken in connection with the accompanying drawing and its scope will be pointed out in the appended claims. Fig. 1 of the accompanying drawing diagrammatically illustrates an embodiment of my invention as applied to an electric valve circuit for transmitting power between a single phase alternating current circuit and a direct current circuit, and Fig. 2 represents an operating characteristic thereof. Fig. 3 is a modification of the arrangement shown in Fig. 1, and Fig. 4 is a still further modification which permits progressive variation in phase displacement by movement of an actuating member progressively in one direction.

Referring to Fig. 1 of the accompanying drawing, there is diagrammatically illustrated an embodiment of my invention as applied to an electric valve translating circuit for transmitting energy from an alternating current circuit 1 to a direct current circuit 2 through a transformer 3 and electric valve means 4 and 5. The electric valve means 4 and 5 are preferably of the type employing an ionizable medium, such as a gas or a vapor, and each includes an anode 6, a cathode 7 and a control member or grid 8.

I provide excitation circuits 9 and 10 which are associated with electric valves 4 and 5, respectively, and which control the conductivities thereof by impressing on the associated control members 8 periodic voltages of variable phase displacement relative to the applied anode-cathode voltages in order to control the conductivities of the electric valves. Excitation circuits 9 and 10 are similar in construction and arrangement and in order to facilitate description thereof, excitation circuit 9 associated with electric valve 4 will be described in particular. Excitation circuit 9 includes a saturable inductive device 11 of the type designed to produce a periodic or alternating voltage of peaked wave form and includes a core member 12 having a shunt path 13 and a restricted saturable portion 14, a primary winding 15, and a secondary winding 16 which is associated with the restricted portion 14 and in which there is induced an alternating voltage of peaked wave form. The maximum value of the alternating voltage of peaked wave form induced in secondary winding 16 occurs at substantially the maximum value of the alternating voltage applied to primary winding 15. A suitable source of negative unidirectional biasing potential, such as a battery 17, is employed to impress a negative potential on control member 8 and a current limiting resistance 18 is connected in series relation with the battery 17.

I provide a phase shifting circuit 19 which includes a winding 20 which is energized from the alternating current circuit 1 or from any other suitable source of alternating current of proper frequency. The winding 20 is provided with a pair of terminal connections 21 and 22 and a connection 23 which is electrically intermediate the terminal connections. A pair of electric paths is connected to the terminal connection 22; one path includes a capacitance 24 and the other path includes an inductance 25. To connect selectively capacitance 24 or inductance 25 in the phase shifting circuit 19, I provide any suitable means such as a switch 26 having a movable member 27 and stationary contacts 28 and 29.

An adjustable resistance 30 is connected across terminal connection 21 of winding 20 and the switch 26. An output circuit 31 for the phase shifting circuit 19 is provided and is connected across the intermediate connection 23 and switch 26. The switch 26 establishes two ranges or regions through which the phase of the alternating voltage impressed on output circuit 31 may be varied and the adjustable resistance 30 permits variation of the phase of the alternating voltage within these regions or ranges. Output circuit 31 is connected to primary windings 15 of saturable inductive devices 11 in excitation circuits 9 and 10.

The operation of the embodiment of my invention shown in Fig. 1 will be explained by considering the system when power is being transmitted from the alternating current circuit 1 to the load circuit 2 through the transformer 3 and electric valves 4 and 5. As is understood by those skilled in the art, the average value of the direct current transmitted to the load circuit 2 by the electric valves 4 and 5 may be controlled by controlling the phase of the alternating voltage impressed on control members 8 relative to the applied anode-cathode voltages of these electric valves. The average voltage impressed on the load circuit 2 by electric valves 4 and 5 is maximum when the electric valves are rendered conductive at the beginning of the positive half cycles of applied anode voltage, and for an inductive load connected to circuit 2 the average voltage is substantially zero when the electric valves are rendered conductive at substantially the 180 electrical degree position. For intermediate phase positions, the average voltage impressed on circuit 2 assumes corresponding intermediate values. The saturable inductive devices 11 in excitation circuits 9 and 10 impress alternating voltages of peaked wave form on control members 8 to render the electric valves conductive at predetermined times during the cycles of applied anode-cathode voltage. The phase shifting circuit 19 impresses an alternating voltage variable in phase on the primary windings 15 of the saturable inductive devices 11. When the movable contact 27 of switch 26 is in the position shown, that is, when the capacitance 24 is effectively connected in the phase shifting circuit 19, the voltages of peaked wave form impressed on control members 8 of electric valves 4 and 5 may be varied within the second lagging quadrant relative to the applied anode-cathode voltages. The variation in phase of the voltages is accomplished by controlling the effective resistance of the adjustable resistance 30. To effect an advancement in phase from the 180 electrical degree lagging position to the 90 electrical degree lagging position, resistance 30 is initially adjusted so that the effective resistance thereof is large. The phase of the peaked voltage is progressively advanced by progressively decreasing the effective value of resistance 30 to a substantially zero value.

When the movable contact 27 of switch 26 is moved to engage stationary contact 29, the phase of the voltages of peaked wave form impressed on control members 8 may be varied from the 90 degree lagging position to a substantially inphase position relative to the applied anode-cathode voltage. Within this region of operation, when the inductance 25 is connected in the phase shifting circuit 19, the resistance 30 is adjusted so that its effective value is substantially zero and it is progressively increased in value to effect a progressive advancement in phase. It is to be noted that the embodiment of my invention shown in Fig. 1 permits the smooth and continuous control of the phase of the alternating voltage impressed on control members 8 from the 180 degree lagging position to the in-phase position. This may be effected by moving the contact 27 from the stationary contact 28 to the stationary contact 29 when the effective value of the resistance 30 is substantially zero.

The manner in which the phase shifting circuit 19 operates may be better understood by referring to the operating characteristics shown in Fig. 2 where the vector AB represents the voltage applied to the terminals of winding 20 and the point O represents the potential of the intermediate connection 23 of winding 20. When the switch 26 is in the position shown, that is, when the capacitance 24 is connected in circuit, the voltage impressed on the output circuit 31 may be represented by a vector OC. The vector AC represents the voltage appearing across the terminals of adjustable resistance 30 and the vector CB represents the voltage appearing across the capacitance 24. It is to be understood that the position of the point C varies along an arc of the circle as the value of the resistance 30 is varied. Of course, this voltage may be reversed 180 degrees by the proper connection by primary windings 15 of the saturable inductive devices 11, so that the voltage has a phase position as represented by vector OC'. When the movable contact 27 of switch 26 engages contact 29, that is, when the inductance 25 is connected in circuit, the voltage impressed on the output circuit 31 may be represented by vector OD. In this case, the voltage appearing across the terminals of resistance 30 may be represented by vector AD and the voltage appearing across the terminals of inductance 25 may be represented by the vector DB. Of course, the phase of the voltage of circuit 31 may be effectively reversed 180 electrical degrees by the proper connection of the primary winding 15 of saturable inductive devices 11. Considering the direction of rotation to be as indicated by the arrow, it is clear that the phase of the alternating voltages impressed on windings 15 of the inductive devices 11 may be varied through two distinct ranges or regions. For example, when the capacitance 24 is connected in circuit the output voltage may be varied throughout the first lagging quadrant and when the inductance 25 is connected in circuit the voltage may be varied in phase throughout the first leading quadrant. Since the alternating voltages of peaked wave form induced in secondary windings 16 of the saturable inductive devices 11 lag the voltages applied to the primary windings 15, these voltages of peaked wave form may be represented by vectors OE and OF. Since the vector OF lags the vector OD' by 90 degrees and since the vector OD' is variable in phase throughout the first leading quadrant, the vector OF is variable throughout the first lagging quadrant. Since the vector OC' is variable in phase throughout the first lagging quadrant, the vector OE is variable in phase throughout the second lagging quadrant. In this manner, the voltages of peaked wave form impressed on control members 8 and 9 of electric valves 4 and 5 may be smoothly and continuously varied in phase throughout the first and second lagging quadrants relative to the respective applied anode-cathode voltages.

Another important aspect of my invention is the circuit 19 which produces two different predetermined phase displacements of the output voltage of circuit 31 with respect to the voltage of circuit 1. That is, by the operation of switch 26, the phase of the output voltage impressed on circuit 31 may be changed from one predetermined value to a second predetermined value. It will be appreciated that the different phase displacements are determined by the adjustment of resistance 30. Furthermore, the circuit 19 establishes different predetermined conductivities of electric valves 4 and 5, thereby establishing different fixed voltage ratios between the voltage of the supply circuit 1 and the voltage of the load circuit 2.

In Fig. 3 of the accompanying drawing there is diagrammatically illustrated another embodiment of my invention which is similar in many respects to that shown in Fig. 1 and corresponding elements have been assigned like reference numerals. In many commercial applications, it is desirable that the phase shift be accomplished by moving an actuating element in one direction, as, for example, in a counter-clockwise direction of rotation for a given direction of phase shift. For example, a variable resistance 32 having a resistance element 33 and an adjustable or movable contact 34 is arranged so that movement of the member 34 in the counter-clockwise direction effects advancement in phase when the capacitance 24 is connected in circuit or when the inductance 25 is connected in circuit. An adjustable resistance 35 may be connected between the right-hand terminal of resistance 33 and the actuating member 34 to control or limit the range of phase shift. Where the phase shifting circuit is used in connection with the control of electric valves in welding circuits, the resistance 35 may be adjusted to prevent advancement of the control voltage beyond the angle which corresponds to the power factor angle of the load circuit supplied by the electric valves. In this manner, there is provided a protective feature which prevents advancement in phase of the control voltage beyond the point in the cycle which causes transient electrical conditions, such as extremely large transient current which may be injurious to the electric valves or other associated equipment.

As a means for selectively connecting the capacitance 24 or the inductance 25 in circuit and as a means for changing the connections of the resistance 32 so that the phase shift in the voltage of the output circuit 31 may be obtained by moving the actuating member 34 in one direction, I provide a circuit controlling means 36 including contacts 37 and 38 which are connected to capacitance 24 and inductance 25, respectively, and contacts 39 and 40 which are connected to the right-hand terminal of the resistance element 33. Contacts 42 and 43 are connected to the actuating member 34, and a contact 44 is connected to the left-hand terminal of the resistance element 33. An actuating member or movable contact 45 is arranged to engage selectively contacts 37, 40, and 43 or contacts 38, 39, 42 and 44.

In operation the arrangement of Fig. 3 is substantially the same as the arrangement of Fig. 1. If it be assumed that the movable contact 45 of the circuit controlling means 36 is in the right-hand position, that is in a position to connect capacitance 24 in circuit, and if the actuating member 34 of the resistance 32 is in the right-hand position, the phase of the alternating voltage of circuit 31 may be advanced in phase relative to the voltage impressed on coil 20 by moving the member 34 in a counter-clockwise direction. The phase of the voltage of circuit 31 is advanced to substantially 90 electrical degrees by moving the member 34 from the right-hand terminal of resistance 33 to the left-hand terminal. To effect a still further advancement in phase of the voltage of circuit 31, the actuating member or movable contact 45 of the circuit controlling means 35 is moved to the left-hand position to connect the inductance 25 in circuit. To effect a still further advancement in phase of the voltage of circuit 31 for the second position of the actuating member 45, the movable contact 34 of resistance 32 must be returned to the right-hand position and then moved in a counterclockwise direction. It is to be understood that the advance in phase of the voltage of circuit 31 is effected only by moving the member 34 in a counter-clockwise direction of rotation. It is to be understood that the arrangement of Fig. 3 is readily adaptable to an arrangement where it is desired to effect the progressive phase shift by moving an actuating member in a clockwise direction.

In Fig. 4 there is represented a still further embodiment of my invention which is similar in many respects to the arrangements shown in Figs. 1 and 2 and corresponding elements have been assigned like reference numerals. In order to effect the progressive phase shift for progressive movement of an actuating arm or element by using circuits of the type described above, I provide a circuit controlling means 46 having a resistance element 47 provided with terminal connections 48 and 49, an electrically intermediate connection 50 and an actuating element including a movable contact 51 and having an extension 52. To connect selectively capacitance 24 and inductance 25 in circuit, depending upon the direction of movement of the movable contact 51, I provide a suitable switching means 53 having stationary contacts 54 and 55 and a movable contact member 56 which may be spring biased and which is provided with an extension or arm 57 arranged to be engaged by the extension 52 of the movable contact 51.

The phase of the alternating voltage of circuit 30 may be progressively advanced by moving the contact 51 of the circuit controlling means 46 in a clockwise direction. For example, with the movable contact 51 in the extreme left-hand position to engage terminal 48, the effective portion of resistance 47 in circuit is a maximum and due to the position of the movable contact 56, which engages stationary contact 55, the capacitance 24 is connected in circuit. As the movable contact 51 is moved in a clockwise direction, the resistance connected in circuit is decreased effecting an advancement in phase of the voltage of circuit 31 relative to the voltage impressed on winding 20. At substantially the vertical position of the movable contact member, the extension 52 engages arm 57 to move the movable contact member 56 from the position shown to the left-hand position with a snap action so that the member 55 engages stationary contact 54, thereby connecting inductance 25 in the circuit. As the movable contact 51 is moved still further in a clockwise direction, the phase of the alternating voltage of circuit 31 will of course be advanced still further in phase relative to the voltage impressed on winding 20. In this manner, the phase of the output circuit 31 is continuously and smoothly advanced by the progressive movement of an actuating member in the same direction. In like manner, the phase of the voltage of circuit 31 may be progressively retarded with respect to the voltage impressed on winding 20 by moving contact 51 in a counter-clockwise direction of rotation.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, an electric valve connected to said circuit and having an anode, a cathode and a control member, an impedance phase shifting circuit comprising a winding having a pair of terminal connections and an electrical intermediate connection, a resistance element connected to one of said terminal connections, a pair of electric paths connected to the other of said terminals, one of said pair of paths including an inductance and the other including a capacitance and means for selectively connecting said inductance or said capacitance in series relation with said resistance to establish different predetermined degrees of conductivity of said electric valves and to establish thereby different predetermined fixed voltage ratios between the voltage of said supply circuit and the voltage applied to said load circuit by said electric valve means, and means responsive to the voltage between said intermediate connection and the juncture of said resistance and said inductance or capacitance to impress on said control member periodic voltages of different predetermined phase displacements relative to the applied anode-cathode voltage of said electric valve.

2. In combination, an alternating current circuit, a load circuit, electric translating apparatus connected therebetween and including an electric valve having a control member for controlling the conductivity thereof, and apparatus for impressing on said control member a periodic control voltage of peaked wave form variable in phase throughout the first and second lagging quadrants comprising a winding having terminal connections and an electrical intermediate connection, an adjustable resistance connected to one of said terminals, a pair of electric paths one of which includes a capacitance and the other of which includes an inductance connected to the other terminal connection, a switching means for selectively connecting said capacitance or said inductance in circuit with a saturable inductive device having a primary winding connected to said intermediate connection and said switching means and having a secondary winding connected to said control member.

HARRY L. PALMER.